Patented Dec. 31, 1940

2,227,219

UNITED STATES PATENT OFFICE 2,227,219

RESINOUS COMPOSITION AND METHOD OF MAKING THE SAME

Edmond Frank Fiedler, Adams, Mass., assignor to General Electric Company, a corporation of New York No Drawing. Application June 4, 1938, Serial No. 211,949

6 Claims. (Cl. 260—45)

The present invention relates broadly to synthetic resinous compositions, and more particularly is concerned with resins produced from lignin. The resins of this invention will convert under heat and pressure to the infusible insoluble state and can be made into moldable compositions and molded articles of manufacture. The molded products are strong, of good appearance and, in general, are comparable with similar products made from conventional potentially reactive (heat-hardenable) resins.

Lignin is a term which commonly is used to designate the incrusting matter of wood. Its chemical structure is still undetermined. Chief interest in lignin has been the desire to remove it effectively from wood in the preparation of paper pulp. For the most part the lignin has been discarded as a waste product or used as fuel.

The broad proposal has been made heretofore that synthetic resins may be made by reacting lignin with phenol, cresol or other phenolic body. It also has been suggested that aromatic amines such, for example, as aniline, pyridine, piperidine, naphthylamine, quinoline and the like may be reacted with lignin to form resins. The addition of an aldehyde hardening agent to convert the lignin-amine or lignin-phenol resin to the infusible insoluble state has also been proposed. Despite the vast amount of investigational work pertaining to the utilization of lignin in resin manufacture, no practically satisfactory molding compositions are known to have been produced prior to this invention. The products either cured too slowly or had flow or plasticity characteristics which rendered them unsuitable for practical molding operations. The surface finish of the molded article also generally was unsatisfactory.

It is a principal object of the present invention to improve the flow or plasticity and cure rates of potentially reactive lignin-phenolic resins so that strong molded articles of good appearance can be made rapidly and economically with standard molding equipment now in common use in the art.

I have found that the above object can be attained by incorporating a relatively small amount of a compound selected from the class consisting of ammonia, amines and mixtures of ammonia and amines in a liquid resinous product that is obtained by reacting a phenol, lignin and an aldehyde such as formaldehyde, or a compound engendering formaldehyde, under certain particular conditions. More particularly it may be stated that the phenol-lignin-aldehyde reaction is carried out at a suitable temperature, for example at a temperature not exceeding substantially 100° C., in the presence of an alkali-metal basic compound as catalyst. By the term "alkali-metal basic compound" is meant a compound of the alkali metals (sodium, potassium, lithium, rubidium and caesium) which in aqueous solution will give an alkaline reaction. Examples of such compounds are the hydroxides, carbonates, borates and cyanides of the alkali metals. Sodium hydroxide is the preferred catalyst, its use resulting in products having the particular characteristics most desired. The lignin-phenol-aldehyde reaction is allowed to proceed for a period insufficient to cause the separation of the liquid mass into distinct resinous and aqueous layers. The added ammonia, amine or mixture thereof reacts with free formaldehyde which is present, possibly also with the lignin. Whatever its composition may be, the reaction product thus formed appears to plasticize the main resinous body so that moldable compositions produced therefrom have better flow or plasticity, and the molded articles better surface finish, than products free from such reaction product.

The amount of lignin used may be varied over a fairly wide range, depending upon such factors as, for example, the particular lignin and other starting materials employed, the particular conditions of reaction and the particular properties desired in the end-product. However, best results usually are obtained when using not exceeding substantially 130 parts lignin to 100 parts phenolic body. With higher ratios of lignin the mixture of reactants is so viscous, even when hot, that the reaction proceeds less satisfactorily and with greater difficulty in handling both in the reaction vessel and during subsequent cooling. Any lesser amount of lignin may be employed, but from an economical standpoint nothing is gained by using less than 10 parts lignin to 100 parts phenolic body. I prefer to use from 85 to 115 parts lignin to 100 parts of a phenol, and even more specifically it may be stated that I generally use approximately equal proportions of lignin and phenol. All parts herein given are by weight. Since lignin as commercially available always contains free water in varying amounts, for example from about 8 to 11 per cent, all parts herein mentioned refer to net dry lignin, that is lignin calculated to a moisture-free basis.

In all cases the mol ratio of aldehyde to phenol should be at least 15 per cent in excess. Preferably, for each mol phenolic body there is used from 1.25 to 2.5 mols aldehyde such as formaldehyde. Larger amounts of formaldehyde can be used, but there is no particular advantage therein since the unreacted formaldehyde volatilizes and is lost during the subsequent dehydration process. Best results have been obtained, other conditions being the same, when from 1.5 to 2 mols formaldehyde (approximately 45 to 60 grams) were used for each mol of a phenolic body (approximately 100 grams). In carrying the invention into effect the formaldehyde preferably is introduced in the form of an aqueous solution.

The amount of ammonia, amine or mixture of ammonia and amine employed is relatively small in comparison with the amount of phenol. In most cases not exceeding substantially 20 parts of such reactant should be used for each 100 parts phenol. Higher amounts make it more difficult to obtain heat-hardenable molding compositions having flow or plasticity characteristics and cure rates suitable for practical use. In determining the optimum amount of ammonia, amine or mixture thereof to be used, consideration must be given to the reactivity or strength of such base. For example, although in certain cases as much as 20 parts aniline may be necessary to obtain the desired results, it is possible with certain other amines as, for instance, ethylene diamine to obtain equivalent results with as little as 0.25 part of such amine to 100 parts phenol. The preferred amine is aniline, advantageously using 3 to 10 parts aniline to 100 parts phenolic body. Aniline was found to give the most generally satisfactory results over a wide range of operating conditions. However, this invention is not limited to aniline. For example, I may use ammonia, or an aromatic amine such as phenylene diamine and the like, or an aliphatic amine such as methyl amine, ethyl amine, diethylene tetramine and the like, or mixtures of such amines with ammonia.

The amount of alkali-metal basic compound used as catalyst also is relatively small as compared with the amount of phenol and may range, for example, from 0.5 to 5.0 per cent by weight of the phenolic body. The higher the temperature at which the reaction is carried out, the lower should be the amount of catalyst. The percentage employed in general will be somewhat lower, other conditions being the same, when hydroxides of the alkali metals are used as compared with the corresponding metal salts such as carbonates, cyanides and borates. With the preferred catalyst (NaOH), from 2 to 4 parts of the same per 100 parts phenol is in general effective in producing the desired results.

In order that those skilled in the art better may understand how the present invention may be carried into effect, the following illustrative examples thereof are given:

*Example 1*

| | Parts by weight |
|---|---|
| Phenol | 300 |
| Lignin from wood (net dry) | 300 |
| Aqueous solution of formaldehyde (37½%) | 450 |
| Sodium hydroxide | 11.5 |
| Aniline | 15.3 |

The phenol used in this and in other examples hereinafter given was a commercial grade containing approximately 82 per cent phenol, the remainder consisting mainly of cresol. Its mol weight is herein considered as being approximately 97.

The phenol is charged into a jacketed reaction vessel or kettle provided with a reflux condenser, and the lignin is added. The two ingredients are mixed thoroughly, while heating by means of steam introduced into the jacket of the kettle to a temperature sufficient to dissolve or disperse the lignin in the liquid phenol, for example, to 50° to 100° C. Thereafter the cold formaldehyde solution is added while continuing the agitation. The temperature drops. Heating is continued, and when the temperature reaches approximately 65° to 70° C. the sodium hydroxide dissolved in approximately an equal weight of water is added, taking care to avoid violent reaction between the components.

The reaction is allowed to proceed for approximately 30 minutes after the addition of the caustic soda, at a boiling temperature (approximately 92° to 100° C.). At the end of the predetermined reaction period the aniline is added, and stirred and reacted with the other components for a suitable period of time. Usually reacting for about 5 minutes is sufficient, but a longer period of reaction, for example about 30 minutes, in some cases may be desirable. The reaction should not be allowed to proceed to the point where the liquid mass separates into distinct resinous and aqueous layers. Otherwise, effective dehydration of the mass is rendered more difficult and the resin may convert to a solid, infusible state before it is completely dehydrated. Further, even if the mass should be successfully dehydrated without conversion of the resin, molding compositions having practically satisfactory flow or plasticity characteristics and cure rates are difficult, and often impossible, to obtain when the reaction is carried to the point where separation of the mass into distinct layers takes place.

The liquid resinous mass is dehydrated, preferably under reduced pressure. Upon the application of vacuum the temperature of the mass drops, but rises slowly with continued heating to a temperature which is not permitted to exceed substantially 110° C. Dehydration is continued until a sample of the resin taken from the kettle is hard and brittle when cold, and has a flow point within the range of 65° to 95° C.

The resulting resin is compounded, in any suitable manner, with addition materials such, for instance, as wood flour, asbestine, clay, cloth cuttings, etc., or with coloring materials such as dyes or pigments, or with mold lubricants, plasticizer, etc., or with combinations of such materials. Thus, the hot resin may be withdrawn from the kettle and rapidly cooled, for example in shallow pans, thereby preventing the resin from advancing materially toward the infusible, insoluble state. The cold resin preferably is pulverized and mixed in finely divided state with the addition materials. Mixing may be done by milling on steam-heated rolls, or in a Banbury mixer, or by any other suitable masticating machine.

A molding composition produced as described above will cure under heat and pressure to the infusible, insoluble state without the addition of an accelerator of curing. Preferably, however, a small amount of an alkaline substance such as powdered hydrated lime is incorporated into the molding composition in order more quickly to convert the resin under heat and pressure to the infusible state. Depending upon the extent to which the resin has advanced prior to compounding, and the properties desired in the molding composition, the amount of hydrated lime may vary, for example, from 0.5 to 10 per cent by weight of the resin. Usually the amount of added lime is of the order of 1 to 4 per cent. Within this latter range, samples of resins produced in accordance with the instant example, when blended with approximately 50 per cent wood flour filler, yield molding compositions comparable with the conventional phenol-aldehyde resin molding compositions in rate of cure, as also in other respects. More specifically, it may be stated that when these molding compositions are pressed into the form of discs, 4 inches in diameter and ⅛ inch thick, they will cure to the infusible insoluble state in from 45 to 75 seconds at a temperature of 165° C. and under a pressure of approximately 2000 pounds per square inch. The impact strength of the molded article (½" x ½" bar) is above 0.65 foot pounds, the flexural strength is of the order of 9,000 to 10,000 pounds per square inch, dielectric strength above 35 volts per mil, while the specific gravity of the material is approximately 1.36 to 1.38.

*Example 2*

|  | Parts by weight |
|---|---|
| Phenol | 1048 |
| Lignin from wood (net dry) | 1048 |
| Aqueous solution of formaldehyde (37½%) | 1450 |
| Sodium hydroxide (in 35 parts water) | 35 |
| Aniline | 90 |

Essentially the same procedure was followed in making the resin as described under Example 1. One hundred parts of the resin mixed with 4 parts hydrated lime, 1 part montan wax and 10 parts wood flour (to minimize caking during mixing) gave a product having a melting point of 81° C. and which cured to a stringy state in 15 seconds and to a rubbery state in 31 seconds, when a small pill of the material was worked on a 170° C. hot plate. Mixed with an additional 45 parts of wood flour, molded articles of good strength and appearance resulted upon molding under heat and pressure.

*Example 3*

|  | Parts by weight |
|---|---|
| Phenol | 300 |
| Lignin from wood (net dry) | 300 |
| Aqueous solution of formaldehyde (37½%) | 400 |
| Sodium hydroxide (in 15 parts of water) | 15 |
| Sulfuric acid (in 15 parts water) | 5.9 |
| Aniline | 30.6 |

Essentially the same procedure was followed as described under Example 1, with the exception that at the end of the initial reaction period the alkalinity of the resinous mass was partly neutralized by the addition of the stated amount of sulfuric acid. Thereafter the aniline was added, and the batch further processed as under Example 1. This gives a somewhat faster curing resin than the product of Example 1 but it is also somewhat more viscous.

*Example 4*

|  | Parts by weight |
|---|---|
| Cresol | 300 |
| Lignin from wood (net dry) | 300 |
| Aqueous solution of formaldehyde (37½%) | 300 |
| Sodium hydroxide (in 10 parts water) | 7.88 |
| Aniline | 10.2 |

Essentially the same procedure was followed as described under Example 1. In general, molded articles produced from cresol-lignin-aldehyde resins are slightly slower curing, somewhat less water-resistant and of lower mechanical strength than when made from the corresponding phenol-lignin-aldehyde resins, but are somewhat better in electrical properties.

*Example 5*

|  | Parts by weight |
|---|---|
| Phenol | 300 |
| Lignin from wood (net dry) | 300 |
| Aqueous solution of formaldehyde (37½%) | 350 |
| Sodium hydroxide (in 10 parts water) | 9 |
| Aqueous solution of ethylene diamine (70%) | 1.5 |

The procedure was similar to that described under Example 1 with the exception that the ethylene diamine was added before the initial reaction had proceeded very far. A small pill of the resulting resin, when worked on a 170° C. hot plate, cured in 30 seconds to a stringy state and in 56 seconds to a rubbery state. It was initially compounded as follows:

|  | Parts by weight |
|---|---|
| Resin | 200 |
| Hydrated lime | 6 |
| Calcium stearate | 2 |
| Montan wax | 2 |

The resulting blended resin cured in 20 seconds to a stringy state and in 25 seconds to a rubbery state when tested as described above. This compound was blended 50–50 with wood flour, calculated to a net dry basis. The wood flour contained approximately 5 per cent moisture. The mixture was sheeted for 30 seconds on hot rolls maintained at 110° to 115° C. to advance the resin. The resulting molding composition cured to the insoluble infusible state in from 1 to 2 minutes when small articles, such as ashtrays and the like, were molded therefrom, under heat and pressure, in accordance with conventional practice. The molded articles were mechanically strong and of good appearance.

*Example 6*

The same formula was used as described under Example 5 with the exception that 4.5 parts aqueous ammonia (28%) was used in place of the stated amount of ethylene diamine. The procedure also was essentially the same as set forth under that example. The properties of the resin, molding compositions and molded articles are very much the same as the corresponding products of Example 5.

In general, molded parts produced in accordance with the present invention will show a Charpy impact strength not less than 0.5 foot pound on a ½" x ½" bar, a flexural or transverse strength not less than 6000 pounds per square inch and a shrinkage not exceeding 12 mils per inch. The shrinkage is the difference between the cold mold dimensions and the dimensions of the hot molded article, which is usually the ½" x ½" x 5" bar used for impact strength and other tests. The molded articles also will show, in general, a dielectric strength in oil at 100° C. of at least 35 volts per mil, and a water absorption (A. S. T. M. method, 48 hour test) not exceeding 3 per cent. By using the preferred proportions and kinds of ingredients, molded parts can be made which show a Charpy impact strength of at least 0.65 foot pound on a ½" x ½" bar, a flexural strength of at least 8000 pounds per square inch, a dielectric strength in oil at 100° C. from 35 to 200 volts per mil, and a water absorption (A. S. T. M. method, 48 hour test) not exceeding 1.5 per cent.

While I have described my invention with particular reference to lignin from wood, it is to be understood that the invention is not limited thereto and that lignin from other sources may be used in carrying the present invention into effect. The term "lignin" as used broadly herein includes within its meaning not only the common meaning of the word, viz., the non-cellulose constituents of wood, but also lignin as produced synthetically or as obtained from other materials such, for instance, as peanut hulls, cottonseed hulls, corn stalks, straw, etc.

What I claim as new and desire to secure by Letters Patent of the United States is:

1. A potentially reactive resinous composition which is the dehydrated reaction product of a relatively small amount of an amine with the liquid product of reaction of, by weight, 100 parts of a phenol, not exceeding substantially 130 parts lignin, and an aqueous solution of formaldehyde in the ratio of 1 mol phenol to at least 1.15 mols formaldehyde and in the presence of an alkali-metal hydroxide as catalyst, the reaction mass being homogeneous and showing no layer separation of water throughout the entire reaction period prior to dehydration of the liquid resinous reaction product.

2. A heat-hardenable molding composition comprising a filler and a potentially reactive resinous composition which is the dehydrated reaction product of, by weight, not exceeding substantially 20 parts of an amine with the liquid product of reaction of 100 parts phenol, not exceeding substantially 130 parts lignin, and an aqueous solution of formaldehyde in the ratio of 1 mol phenol to 1.25 to 2.5 mols formaldehyde and in the presence of a relatively small amount of sodium hydroxide as catalyst, the reaction mass being homogeneous and showing no layer separation of water throughout the entire reaction period prior to dehydration of the liquid resinous reaction product.

3. A molded article of manufacture consisting of the product of molding under heat and pressure a heat-hardenable molding composition comprising a filler and a potentially reactive resinous composition which is the dehydrated reaction product of, by weight, 3 to 10 parts aniline with the liquid product of reaction of 100 parts phenol, 85 to 115 parts wood lignin and 45 to 60 parts formaldehyde in the presence of a relatively small amount of sodium hydroxide as catalyst, the reaction mass being homogeneous and showing no layer separation of water throughout the entire reaction period prior to dehydration of the liquid resinous reaction product.

4. The method which comprises partly reacting a phenol, lignin and an aqueous solution of an excess of aldehyde in the presence of a relatively small amount of an alkali-metal basic compound as catalyst at a temperature not exceeding substantially 100° C. for a period insufficient to cause separation of the mass into distinct resinous and aqueous layers, adding to the resulting liquid reaction product a relatively small amount of a compound selected from the class consisting of ammonia, amines and mixtures of ammonia and amines, reacting the resulting mixture at a temperature not exceeding substantially 100° C. for a period insufficient to cause separation of the mass into distinct resinous and aqueous layers, and dehydrating the mass thereby obtained.

5. A molded article of manufacture consisting of the product of molding under heat and pressure a heat-hardenable molding composition comprising a filler and a potentially reactive resinous composition which is the dehydrated reaction product of, by weight, approximately 15 parts aniline with the liquid, sodium hydroxide catalyzed reaction product of 300 parts phenol, 300 parts lignin from wood and formaldehyde in an amount corresponding to 450 parts of an aqueous solution of formaldehyde containing 37½% formaldehyde, the reaction mass being homogeneous and showing no layer separation of water throughout the entire reaction period prior to dehydration of the liquid resinous reaction product.

6. A potentially reactive resinous composition which is the dehydrated reaction product of a relatively small amount of a compound selected from the class consisting of ammonia, amines and mixtures of ammonia and amines with the liquid product of reaction of a phenol, lignin and an aqueous solution of an excess of aldehyde in the presence of an alkali-metal basic compound as catalyst, the reaction mass being homogeneous and showing no layer separation of water throughout the entire reaction period prior to dehydration of the liquid resinous reaction product.

EDMOND FRANK FIEDLER.